United States Patent
Kabe et al.

(10) Patent No.: US 8,174,820 B2
(45) Date of Patent: May 8, 2012

(54) SOLID ELECTROLYTIC CAPACITOR AND METHOD FOR MANUFACTURING SAME

(75) Inventors: Isao Kabe, Tokyo (JP); Hideki Oohata, Tokyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 806 days.

(21) Appl. No.: 12/093,123

(22) PCT Filed: Nov. 8, 2006

(86) PCT No.: PCT/JP2006/322288
§ 371 (c)(1),
(2), (4) Date: Jun. 12, 2008

(87) PCT Pub. No.: WO2007/055247
PCT Pub. Date: May 18, 2007

(65) Prior Publication Data
US 2009/0034163 A1    Feb. 5, 2009

Related U.S. Application Data

(60) Provisional application No. 60/737,381, filed on Nov. 17, 2005, provisional application No. 60/737,422, filed on Nov. 17, 2005, provisional application No. 60/754,211, filed on Dec. 28, 2005.

(30) Foreign Application Priority Data

Nov. 9, 2005  (JP) ................................ 2005-324909
Nov. 9, 2005  (JP) ................................ 2005-325116
Dec. 21, 2005 (JP) ................................ 2005-368317

(51) Int. Cl.
*H01G 9/04*     (2006.01)
*H01G 9/145*    (2006.01)

(52) U.S. Cl. .................... 361/532; 29/25.03; 361/528
(58) Field of Classification Search .......... 361/523–526, 361/528, 532; 29/25.03
See application file for complete search history.

(56) References Cited

U.S. PATENT DOCUMENTS

| | | | |
|---|---|---|---|
| 6,036,734 A * | 3/2000 | Taketani et al. | ............. 29/25.03 |
| 6,144,280 A | 11/2000 | Amada et al. | |
| 6,249,424 B1 | 6/2001 | Nitoh et al. | |
| 6,449,830 B1 | 9/2002 | Amada et al. | |
| 2002/0190832 A1 | 12/2002 | Amada et al. | |
| 2005/0278915 A1 * | 12/2005 | VanNatta et al. | ............ 29/25.03 |

FOREIGN PATENT DOCUMENTS

JP              64-81210 A        3/1989
(Continued)

*Primary Examiner* — Eric Thomas
(74) *Attorney, Agent, or Firm* — Sughrue Mion, PLLC (57) ABSTRACT

An element for a solid electrolytic capacitor having low equivalent series resistance (ESR) and high capacitance per unit volume obtained by controlling the composition or the thickness of the silver paste forming a laminated structure on the anode substrate having a carbon paste layer on the surface. Using two kinds of silver pastes each having different wettability on the carbon paste layer and applying each silver paste on the side (edge) portions and face portions of an anode substrate, respectively, a desired layer thickness can be obtained as a whole. A solid electrolytic capacitor element preferably has a silver paste layer coating the side (edge) portions of the anode substrate which is thicker than the silver paste layer covering the face portions of the anode substrate, wherein a silver paste of composition having a water amount of 0.5 mass % or less is preferably used.

44 Claims, 2 Drawing Sheets

FOREIGN PATENT DOCUMENTS

| | | | |
|---|---|---|---|
| JP | 01261815 A | * | 10/1989 |
| JP | 10-172853 A | | 6/1998 |
| JP | 11-251204 A | | 9/1999 |
| JP | 2000-68158 A | | 3/2000 |
| JP | 2002-15957 A | | 1/2002 |
| JP | 2003-86449 A | | 3/2003 |
| JP | 2004-103927 A | | 4/2004 |
| JP | 2004-235377 A | | 8/2004 |
| JP | 2005-64282 A | | 3/2005 |
| JP | 2005-294817 A | | 10/2005 |
| KR | 20010063730 A | * | 4/2003 |

* cited by examiner

SOLID ELECTROLYTIC CAPACITOR AND METHOD FOR MANUFACTURING SAME

CROSS-REFERENCE TO RELATED APPLICATIONS

This is an application filed pursuant to 35 U.S.C. Section 111(a) with claiming the benefit of U.S. Provisional application Ser. No. 60/737,422 filed Nov. 17, 2005, No. 60/737,381 filed Nov. 17, 2005 and No. 60/754,211 filed Dec. 28, 2005 under the provision of 35 U.S.C. Section 111(b), pursuant to 35 U.S.C. Section 119(e)(1).

TECHNICAL FIELD

The present invention relates to a solid electrolytic capacitor having low ESR and high capacitance. Specifically, the invention relates to a solid electrolytic capacitor having low ESR (equivalent series resistance), wherein the capacitance per unit volume is increased at the same time, and a production method thereof.

BACKGROUND ART

Recently, with developments on digitalization of electric devices and higher-speed personal computers, capacitors, downsized but having large capacitance and low impedance in a high-frequency region, are demanded, and there have been proposed solid electrolytic capacitors using electroconductive polymer having electron conductivity as solid electrolyte.

Figure 1:
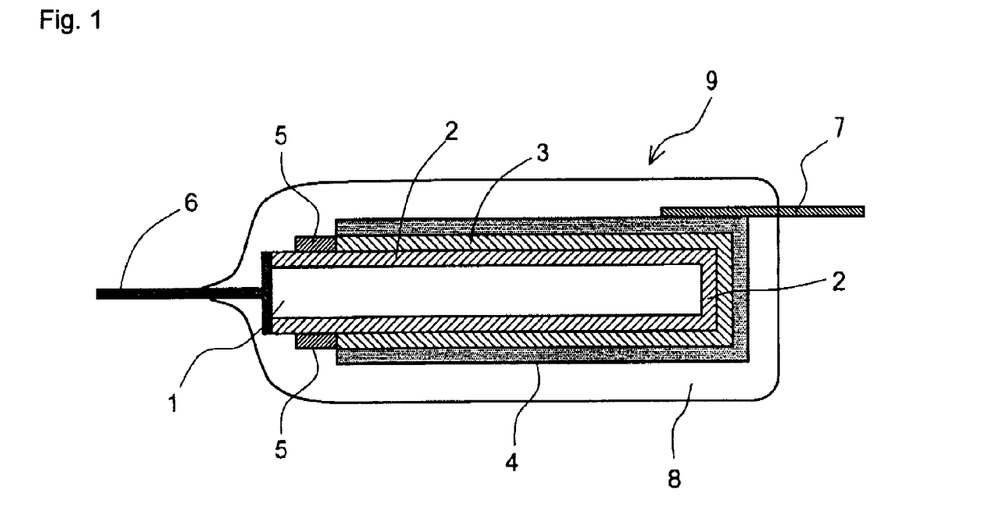
[FIG. 1] A sectional view showing a typical structure of an element for a solid electrolytic capacitor

In a production method of a solid electrolytic capacitor (9), generally, a solid electrolytic capacitor element is produced by forming a dielectric oxide film layer (2) on an anode substrate (1) consisting of a metal foil or a thin sheet having a large specific surface area increased by etching treatment as shown in FIG. 1, forming thereon a solid semiconductor layer (3) (hereinafter referred to as solid electrolyte) as a counter electrode, and further forming a conductor layer (4) of electroconductive paste or the like. Generally, a masking layer (5) is further provided thereto, electrode leads (6, 7) are added as appropriate and the whole is to be encapsulated by resin (8) to become a capacitor.

Figure 2:
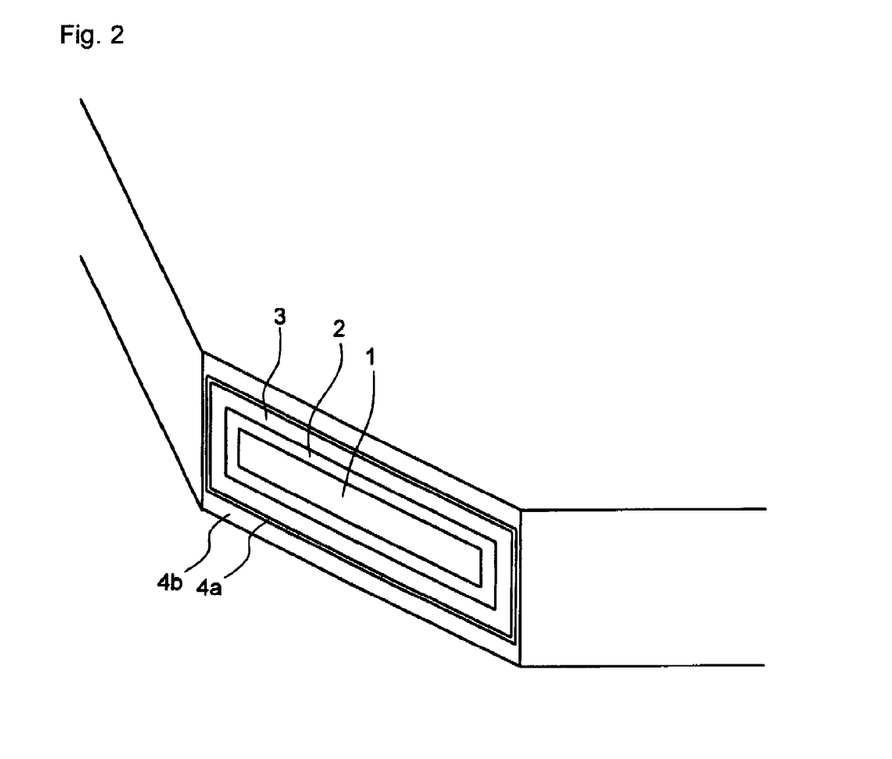
[FIG. 2] A view showing a frame format of a conventional paste coating structure in a solid electrolytic capacitor element

A silver paste is mainly used for the above-mentioned conductor layer (4). Since silver readily migrates at a high temperature, generally, a silver paste layer (4b) comprising silver particles is formed on a carbon paste layer (4a) comprising carbon particles (see FIG. 2). These layers can be formed by dipping the anode substrate sequentially in liquid containing the component of each layer, respectively. Since the substrate of a capacitor element is generally in a shape of a thin plate, the thickness of the formed silver paste layer becomes different in the face part and in the side (edge) part of the substrate as in FIG. 2. Specifically, the thickness of the layer tends to be reduced on the side (edge) part, and as a result, equivalent series resistance (ESR) is likely to be high, which is undesirable. Though the thickness of the layer on the side (edge) part can be increased by applying a thicker layer to the whole of the substrate, in this case, the layer becomes thicker on the face part as well, and therefore the thickness per element increases, which lowers the capacitance per unit volume of a laminated capacitor produced by laminating the elements. Accordingly, a solid electrolytic capacitor produced by laminating silver paste is demanded in which the layer thickness on the face part is suppressed while that on the side (edge) part is sufficiently secured.

When applying silver paste covering the side (edge) part of the anode substrate on the surface of which an oxide film layer, an electroconductive polymer layer and a carbon paste layer are sequentially laminated by a dipping method, i.e., dipping the anode substrate on which the above-mentioned layers are sequentially laminated into silver paste and then pulling it up, the silver paste layer deposited on the side (edge) part becomes thinner compared to that formed on the face part. As a result, the electric resistance to the electric current flowing from the bottom surface to the top surface becomes higher compared to the resistance to the current flowing alongside a surface of the anode substrate. Consequently, a solid electrolytic capacitor comprising silver paste applied by a dipping method tends to have higher ESR compared to a solid electrolytic capacitor comprising silver paste applied by a brush.

Meanwhile, when silver paste is applied by a brush, uneven application occurs and the thickness of a silver paste layer formed on the applied surface varies. Particularly, when a silver paste containing fluorine resin is used, the thickness tends to be uneven. When increasing the amount of silver paste to be applied so as to prevent thin portions of a silver layer, it generates unnecessarily thick portions of a silver layer, and thereby reduces the number of elements which can be encapsulated in a chip with a certain height and lowers the capacitance per unit volume of a capacitor.

Therefore, with respect to a solid electrolytic capacitor comprising an oxide film layer, an electroconductive polymer layer, a carbon paste layer and a silver paste layer sequentially formed on the surface of an anode substrate comprising valve-acting metal, a solid electrolytic capacitor is demanded which has a laminated structure of a silver paste layer on an anode substrate having a carbon paste layer on the surface and has a sufficiently low equivalent series resistance (ESR) and a high capacitance per unit volume.

DISCLOSURE OF THE INVENTION

Consequently, an object of the present invention is to provide a solid electrolytic capacitor which has a laminated structure of a silver paste on the anode substrate and has a sufficiently low equivalent series resistance (ESR) and a high capacitance per unit volume.

As a result of intensive studies to achieve the above object, the present inventors have found that a element for a solid electrolytic capacitor having sufficiently low equivalent series resistance (ESR) and a high capacitance per unit volume can be obtained by controlling the composition or a layer thickness of the silver paste constituting a laminated structure on the anode substrate having a carbon paste layer on the surface. The present invention enables to control the thickness of the silver paste layers on the face portions and on the side (edge) portions, which silver paste constitutes a laminated structure on the anode substrate. Using two kinds of silver pastes each having different wettability on the carbon paste layer, the present inventors have found that when applying a silver paste of a composition having lower wettability and that having higher wettability on the side (edge) portions and face portions of an anode substrate, respectively, a desired layer thickness can be obtained as a whole. The present inventors have also found that the phenomenon has a wide application in forming a laminated structure comprising a first and a second layers sequentially. Also, the present inventors have confirmed that when a silver paste layer covering the side (edge) portions of the anode substrate having a carbon paste layer on the surface is thicker than the silver paste layer covering the face portions covering the anode substrate, an element for a solid electrolytic capacitor having low equivalent series resistance (ESR) and at the same time larger capacitance per unit volume can be obtained. Furthermore, the present inventors have noticed that when a silver paste having a water amount of 0.5 mass % or less is laminated on the anode substrate of an element, a solid electrolytic capacitor having even lower equivalent series resistance (ESR) can be obtained. The present invention was accomplished based on these findings.

When silver paste is applied by a brush, uneven application occurs and the thickness of a silver paste layer formed on the applied surface varies. When increasing the amount of silver paste to be applied so as to prevent thin portions of a silver layer, it generates unnecessarily thick portions of a silver layer, and thereby causes a problem that the number of elements which can be encapsulated in a chip with a certain height reduces, which lowers the capacitance per unit volume of a capacitor.

Meanwhile, when a silver paste is applied by a dipping method, the silver paste layer deposited on the side (edge) part becomes thinner compared to that formed on the face part. As a result, the electric resistance to the electric current flowing from the bottom surface to the top surface becomes higher compared to the resistance to the current flowing alongside a surface of the anode substrate. Consequently, there has been a problem with a solid electrolytic capacitor comprising silver paste applied by a dipping method that it tends to have higher ESR compared to a solid electrolytic capacitor comprising silver paste applied by a brush. Particularly, when a silver paste containing fluorine resin is used, the thickness tends to be uneven.

The present inventors have found that in a solid electrolytic capacitor comprising an oxide film layer, an electroconductive polymer layer, a carbon paste layer and a silver paste layer sequentially formed on the surface of an anode substrate comprising valve-acting metal, when a silver paste layer covering the side (edge) portions of the anode substrate is thicker than that covering the face portions, or has a thickness of 10 µm or more, the above problems can be solved and accomplished the present invention.

The present inventors have also found that by a method for producing a solid electrolytic capacitor comprising an oxide film layer, an electroconductive polymer layer, a carbon paste layer and a silver paste layer sequentially formed on the surface of an anode substrate comprising valve-acting metal, including a step of dipping the anode substrate on the surface of which an oxide film layer, an electroconductive polymer layer and a carbon paste layer are sequentially laminated into silver paste and a step of applying silver paste by a brush on the side (edge) portions of the anode substrate, a capacitor can be produced, wherein the thickness of a silver paste layer does not vary greatly and therefore the capacitance per unit volume is high and ESR is low. The present invention was accomplished based on this finding.

The organic solvent added to silver paste forming a laminated structure of a solid electrolytic capacitor may absorb water content in the air at the time of preparing silver paste and forming a laminated structure by coating or the like, which may result in the increase of the water content of the silver paste. And when the silver paste having an increased water content is laminated on a solid electrolytic capacitor, ESR of the capacitor cannot be sufficiently low. As a result of intensive studies based on the finding, the present inventors have found that in a solid electrolytic capacitor comprising an oxide film layer, an electroconductive polymer layer, a carbon paste layer and a silver paste layer sequentially formed on the surface of an anode substrate comprising valve-acting metal, the capacitor can have sufficiently low ESR when the silver paste constituting the laminated structure of the capacitor has water content of 0.5 mass % or less, particularly 0.3 mass % or less. The present inventors have also found that the water content of the silver paste can be adjusted to 0.5 mass % or less, preferably 0.3 mass % or less at low humidity and accomplished the present invention.

The present invention relates to the following element for a solid electrolytic capacitor having low ESR and high capacitance, a solid electrolytic capacitor comprising the solid electrolytic capacitor element, a laminated solid electrolytic capacitor produced by laminating the solid electrolytic capacitor elements, a method for forming a laminated structure, a method for producing a solid electrolytic capacitor element, a solid electrolytic capacitor element produced by the method and silver paste constituting the laminated structure of a solid electrolytic capacitor.

1. An element for a solid electrolytic capacitor comprising an oxide film layer, an electroconductive polymer layer, a carbon paste layer and a silver paste layer sequentially formed on the surface of an anode substrate comprising a valve-acting metal material, wherein the composition or the thickness of a silver paste layer covering the side (edge) portions and that of a silver paste layer covering the face portions of the anode substrate on the surface of which an oxide film layer, an electroconductive polymer layer and a carbon paste layer are sequentially laminated is controlled.

2. The element for a solid electrolytic capacitor as described in 1 above, wherein the thickness of the silver paste layer covering the side (edge) portions of the anode substrate is 6 µm or more and the thickness of the silver paste layer covering the face portions of the anode substrate is 20 µm or less.

3. The element for a solid electrolytic capacitor as described in 1 above, wherein a laminated structure is formed by applying liquid A, which has a composition containing materials to form a silver paste layer on the anode substrate having a carbon paste layer on the surface, on the side (edge) portions of the anode substrate and by applying liquid B comprising the materials to form the silver paste layer and having a composition of higher wettability than that of liquid A on the face portions of the anode substrate.

4. The element for a solid electrolytic capacitor as described in 3 above, wherein a laminated structure is formed by applying liquid A on the side (edge) portions of the anode substrate, drying it, and then applying liquid B on the face portions of the anode substrate by dipping the anode substrate into liquid B.

5. The element for a solid electrolytic capacitor as described in 4 above, wherein a laminated structure is formed by applying liquid A on only the lower side (edge) portion of the anode substrate by dipping the portion into liquid A, drying it and then applying liquid B on the face portions of the anode substrate by dipping the anode substrate including the face portions into liquid B.

6. The element for a solid electrolytic capacitor as described in 3 above, wherein a laminated structure is formed by applying liquid B on the face portions of the anode substrate, drying it and then coating the side (edge) portions of the anode substrate by liquid A by dipping the anode substrate into liquid A.

7. The element for a solid electrolytic capacitor as described in any one of 3 to 6 above, wherein at least one of the carbon paste layer and the silver paste layer is a coating layer comprising fluorine resin.

8. The element for a solid electrolytic capacitor as described in any one of 1 to 7 above, wherein the shape of the anode substrate is a plate-shaped foil, a plate or a rod.

9. The element for a solid electrolytic capacitor as described in any one of 1 to 7 above, wherein the dielectric layer provided on the surface of the anode substrate is a layer of an oxide of a valve-acting metal formed on the surface of the valve-acting metal.

10. The element for a solid electrolytic capacitor as described in any one of 1 to 7 above, wherein the valve-acting metal is one member selected from a group consisting of aluminum, tantalum, titanium, niobium, zirconium and alloy thereof.

11. The element for a solid electrolytic capacitor as described in any one of 1 to 7 above, wherein the anode substrate comprising valve-acting metal on the surface of which an oxide film layer is laminated is a chemically-formed aluminum foil.

12. A solid electrolytic capacitor comprising the solid electrolytic capacitor element as described in any one of 1 to 11 above.

13. A laminated solid electrolytic capacitor comprising a laminated body formed by laminating a plurality of the solid electrolytic capacitor element as described in any one of 1 to 11 above.

14. The element for a solid electrolytic capacitor as described in any one of 1 to 7 above, wherein the silver paste layer covering the side (edge) portions of the anode substrate comprising an oxide film layer, an electroconductive polymer layer and a carbon paste layer sequentially formed on the surface is thicker than the silver paste layer covering the face portions of the anode substrate.

15. The element for a solid electrolytic capacitor as described in 14 above, wherein the shape of the anode substrate is a plate-shaped foil, a plate or a rod.

16. The element for a solid electrolytic capacitor as described in 14 above, wherein the dielectric layer provided on the surface of the anode substrate is a layer of an oxide of a valve-acting metal formed on the surface of the valve-acting metal.

17. The element for a solid electrolytic capacitor as described in 14 above, wherein the valve-acting metal is one member selected from a group consisting of aluminum, tantalum, titanium, niobium, zirconium and alloy thereof.

18. The element for a solid electrolytic capacitor as described in 14 above, wherein the anode substrate comprising valve-acting metal on the surface of which an oxide film layer is laminated is a chemically-formed aluminum foil.

19. The element for a solid electrolytic capacitor as described in any one of 1 to 7 above, wherein the silver paste layer covering the side (edge) portions of the anode substrate comprising an oxide film layer, an electroconductive polymer layer and a carbon paste layer sequentially formed on the surface has thickness of 10 μm or more.

20. The element for a solid electrolytic capacitor as described in 19 above, wherein the silver paste layer covering the side (edge) portions of the anode substrate comprising an oxide film layer, an electroconductive polymer layer and a carbon paste layer sequentially formed on the surface has thickness of 10 to 200 μm.

21. The element for a solid electrolytic capacitor as described in 19 above, wherein the shape of the anode substrate is a plate-shaped foil, a plate or a rod.

22. The element for a solid electrolytic capacitor as described in 19 above, wherein the dielectric layer provided on the surface of the anode substrate is a layer of an oxide of a valve-acting metal formed on the surface of the valve-acting metal.

23. The element for a solid electrolytic capacitor as described in 19 above, wherein the valve-acting metal is one member selected from a group consisting of aluminum, tantalum, titanium, niobium, zirconium and alloy thereof.

24. The element for a solid electrolytic capacitor as described in 19 above, wherein the anode substrate comprising valve-acting metal on the surface of which an oxide film layer is laminated is a chemically-formed aluminum foil.

25. The element for a solid electrolytic capacitor as described in any one of 1 to 7 above, wherein silver paste having water content of 0.5 mass % or less is laminated.

26. The element for a solid electrolytic capacitor as described in 25 above, wherein the water content of the silver paste is 0.3 mass % or less.

27. The element for a solid electrolytic capacitor as described in 25 or 26 above, wherein the shape of the anode substrate is a plate-shaped foil, a plate or a rod.

28. The element for a solid electrolytic capacitor as described in any one of 25 to 27 above, wherein the dielectric layer provided on the surface of the anode substrate is a layer of an oxide of a valve-acting metal formed on the surface of the valve-acting metal.

29. The element for a solid electrolytic capacitor as described in any one of 25 to 28 above, wherein the valve-acting metal is one member selected from a group consisting of aluminum, tantalum, titanium, niobium, zirconium and alloy thereof.

30. The element for a solid electrolytic capacitor as described in any one of 25 to 29 above, wherein the anode substrate comprising valve-acting metal on the surface of which an oxide film layer is laminated is a chemically-formed aluminum foil.

31. A method for forming a laminated structure, which is a method for forming a laminated structure comprising a second coating layer on the first coating layer formed on the surface of a foil, comprising a step of applying liquid A containing materials for forming the second coating layer on the side (edge) portions of the foil and a step of applying liquid B containing materials for forming the second coating layer and having lower wettability than that of liquid A on the face portions of the foil.

32. The method for forming a laminated structure as described in 31 above, comprising applying liquid A on the side (edge) portions of the foil, drying it and then applying liquid B on the face portions of the foil by dipping the foil into liquid B.

33. The method for forming a laminated structure as described in 32 above, comprising applying liquid A by dipping only the lower side (edge) portion of the foil into liquid A, drying the foil, and then applying liquid B on the face portions of the foil by dipping the foil including the face portions into liquid B.

34. The method for forming a laminated structure as described in 31 above, comprising applying liquid B on the face portions of the foil, drying it and then coating the side (edge) portions of the foil by dipping the foil into liquid A.

35. The method for forming a laminated structure as described in any one of 31 to 34 above, wherein at least one of the first and second coating layers contains fluorine resin.

36. The method for forming a laminated structure as described in any one of 31 to 35 above, wherein the first coating layer is a carbon paste layer and the second coating layer is a layer of electroconductive paste other than carbon paste.
37. A method for producing an element for a solid electrolytic capacitor, wherein a cathode part is made by sequentially forming a carbon paste layer and an electroconductive paste layer on the solid electrolyte layer of a solid electrolytic capacitor element having a solid electrolyte layer on a part of the surface, using the method for forming a laminated structure as described in 36 above in the step of laminating a carbon paste layer and an electroconductive paste layer.
38. The method for producing an element for a solid electrolytic capacitor as described in 37 above, wherein the electroconductive paste is silver paste.
39. An element for a solid electrolytic capacitor produced by the method as described in 38 above.
40. A solid electrolytic capacitor comprising the solid electrolytic capacitor element as described in 39 above.
41. A laminated solid electrolytic capacitor comprising a laminated body formed by laminating a plurality of the solid electrolytic capacitor element as described in 39 above.
42. A method for producing an element for a solid electrolytic capacitor comprising an oxide film layer, an electroconductive polymer layer, a carbon paste layer and a silver paste layer sequentially formed on the surface of an anode substrate comprising a valve-acting metal material, comprising a step of dipping the anode substrate on the surface of which an oxide film layer, an electroconductive polymer layer and a carbon paste layer are sequentially laminated into silver paste and a step of applying silver paste by a brush on the side (edge) portions of the anode substrate.
43. The method for producing an element for a solid electrolytic capacitor as described in 42 above, wherein the shape of the anode substrate is a plate-shaped foil, a plate or a rod.
44. The method for producing an element for a solid electrolytic capacitor as described in 42 above, wherein the dielectric layer provided on the surface of the anode substrate is a layer of an oxide of a valve-acting metal formed on the surface of the valve-acting metal.
45. The method for producing an element for a solid electrolytic capacitor as described in 42 above, wherein the valve-acting metal is one member selected from a group consisting of aluminum, tantalum, titanium, niobium, zirconium and alloy thereof.
46. The method for producing an element for a solid electrolytic capacitor as described in 42 above, wherein the anode substrate comprising valve-acting metal on the surface of which an oxide film layer is laminated is a chemically-formed aluminum foil.
47. A method for producing an element for a solid electrolytic capacitor comprising an oxide film layer, an electroconductive polymer layer, a carbon paste layer and a silver paste layer sequentially formed on the surface of an anode substrate comprising a valve-acting metal material, wherein silver paste having water content of 0.5 mass % or less is laminated.
48. The method for producing an element for a solid electrolytic capacitor as described in 47 above, wherein the water content of the silver paste is 0.3 mass % or less.
49. The method for producing an element for a solid electrolytic capacitor as described in 47 or 48 above, wherein the shape of the anode substrate is a plate-shaped foil, a plate or a rod.
50. The method for producing an element for a solid electrolytic capacitor as described in any one of 47 to 49 above, wherein the dielectric layer provided on the surface of the anode substrate is a layer of an oxide of a valve-acting metal formed on the surface of the valve-acting metal.
51. The method for producing an element for a solid electrolytic capacitor as described in any one of 47 to 50 above, wherein the valve-acting metal is one member selected from a group consisting of aluminum, tantalum, titanium, niobium, zirconium and alloy thereof.
52. The method for producing an element for a solid electrolytic capacitor as described in any one of 47 to 51 above, wherein the anode substrate comprising valve-acting metal on the surface of which an oxide film layer is laminated is a chemically-formed aluminum foil.
53. Silver paste forming a laminated structure of a solid electrolytic capacitor element comprising an oxide film layer, an electroconductive polymer layer, a carbon paste layer and a silver paste layer sequentially formed on the surface of an anode substrate comprising a valve-acting metal material, which has water content of 0.5 mass % or less.
54. The silver paste as described in 53 above, which has water content of 0.3 mass % or less.

EFFECTS OF THE INVENTION

The present invention enables to obtain a solid electrolytic capacitor having sufficiently low equivalent series resistance (ESR) and high capacitance per unit volume, wherein a laminated structure of silver paste is formed on an anode substrate having a carbon paste layer on the surface. In the present invention, an element for a solid electrolytic capacitor having sufficiently low equivalent series resistance (ESR) and high capacitance per unit volume can be obtained by controlling the composition or the thickness of the silver paste forming a laminated structure on the anode substrate having a carbon paste layer on the surface. By applying two kinds of silver paste, which have a composition of different wettability on the carbon paste layer, to the side (edge) portions and face portions of an anode substrate, respectively, a desired layer thickness can be obtained as a whole. By using the two kinds of silver paste, applying a silver paste of a composition having lower wettability and that of a composition having higher wettability on the side (edge) portions and face portions of an anode substrate, respectively, a desired layer thickness can be obtained as a whole. The phenomenon has a wide application in forming a laminated structure comprising a first and a second layers sequentially. By controlling the thickness of the silver paste forming a laminated structure on the anode substrate having a carbon paste layer on the surface, a laminated structure can be obtained wherein the thickness of each of the silver paste layers covering the side (edge) portions and covering the face portions of the anode substrate is controlled; and a solid electrolytic capacitor element having low equivalent series resistance and high capacitance per unit volume can be produced in which the layer thickness on the side (edge) part is sufficiently secured (preferable layer thickness is 6 μm or more) while the layer thickness on the face part is suppressed (preferable layer thickness is 20 μm or less). The method for controlling the layer thickness is particularly effective, in the case where the anode substrate is a foil, to control the layer thickness of the side (edge) portions and that of the face portions of the foil at the time of forming a laminated structure of silver paste on the anode substrate. A solid electrolytic capacitor element preferably comprises a silver paste layer which is thicker on the side (edge) portions than on the face portions of the anode substrate, and silver paste having water content of 0.5 mass % or less is preferably used. Also, by a method for producing a solid electrolytic capacitor comprising a step of dipping the anode substrate on the surface of which an oxide film layer, an electroconductive polymer layer and a carbon paste layer are sequentially laminated into silver paste and a step of applying silver paste by a brush on the side (edge) portions of the anode substrate, a capacitor can be produced, wherein the thickness of a silver paste layer does not vary greatly and therefore the capacitance per unit volume is high and ESR is low. Further, silver paste having water content of 0.5 mass % or less is preferably used. By adjusting the water content of the silver paste to 0.5 mass % or less, particularly 0.3 mass % or less, a solid electrolytic capacitor having sufficiently low ESR and a method for producing the same can be obtained. It is not known exactly why ESR lowers in a solid electrolytic capacitor wherein a silver paste having water content of 0.5 mass % or less, particularly 0.3 mass % or less is laminated. But when a silver paste having water content exceeding 0.5 mass % is laminated, it is presumed that, when a solvent of the silver paste is dried, water alters the silver paste layer and it leads to the increase of ESR. Consequently, according to the present invention, a solid electrolytic capacitor having even lower ESR and a method for producing the same can be attained.

| EXPLANATION OF REFERENCE NUMBERS | |
|---|---|
| 1 | anode substrate |
| 2 | oxide film layer |
| 3 | solid electrolyte layer |
| 4 | conductor layer |
| 4a | carbon paste layer |
| 4b | electroconductive paste layer |
| 5 | masking layer |
| 6 | anode lead part |
| 7 | cathode lead part |
| 8 | encapsulating resin |
| 9 | solid electrolytic capacitor |

BEST MODE FOR CARRYING OUT THE INVENTION

In a laminating method which comprises forming a second layer (typically a silver paste layer) on the anode substrate (preferably in a shape of a foil) having a first layer (typically a carbon paste layer) on the surface by applying liquid containing materials for forming the second layer (hereinafter called "liquid for forming the second layer"), the present invention is to solve the problem of a phenomenon that the thickness of the second layer on the side (edge) portions extremely decreases compared to that on the face portions.

The anode substrate includes all those with conditions on dimensions which make a difference in the thickness of the second layer on the face portions and on the side (edge) portions when applying the liquid for forming the second layer on the first coating layer. Under such dimensional conditions, though it may generally vary depending on the composition of each of the liquids for forming the first coating layer and the second coating layer, the anode substrate usually includes one with a thickness of 10 mm or less and with a width and a length of a face more than twice the thickness, particularly one with a thickness of 10 to 500 µm and with a width and a length of a face 1 mm or more (a foil is particularly preferable).

The composition of the liquids making up the first and second coating layers that makes a difference in the layer thickness on the face portions and on the side (edge) portions is not particularly limited. However, when at least one of the liquids contains fluorine resin, the phenomenon that the thickness of the layer on the side (edge) portions decreases compared to that on the face portions tends to occur.

For example, the phenomenon applies to the case where the second coating layer is an electroconductive layer (typically a silver paste layer) and the first coating layer is a carbon paste layer.

Hereinafter, the embodiment is explained wherein the foil used preferably as an anode substrate exists independently, however, the foil may be fixed on another substrate or the like as long as the invention can be carried out.

In order to form the above-mentioned laminated structure, the present invention comprises:
(1) a step of applying liquid A of a composition to form the second coating layer to the side (edge) portions of a foil and
(2) a step of applying liquid B containing materials for forming the second coating layer and being made up to have higher wettability on the first coating layer than that of liquid A to the face portions of a foil.

Either of step (1) and (2) may be performed first; for example, when performing step (1) first and then step (2), liquid A containing materials for forming the second coating layer is first applied on the side (edge) portions of the foil having the first coating layer on the surface, and then liquid B which contains materials for forming the second coating layer and is made up so as to have higher wettability on the first coating layer than that of liquid A is applied on both faces of the foil.

Liquid A may be applied to all the side (edge) portions having the first coating layer, any one of the side (edge) portions or only part of one side (edge) portion. For example, in a case of a rectangular foil, step (1) may be performed only for the lower side (edge) portion. In the present invention, wherein the shape of the anode substrate is three-dimensional figure such as a plate-shaped foil, a plate or a rod, the side (edge) portion indicates the lines (edges) constituting the face corresponding to the thickness of the three-dimensional figure and the face portions formed by those lines. With respect to a foil, the side (edge) portions are the edge lines of a foil and the faces made up between those lines and correspond to thickness of the foil. However, due to an accuracy matter of the applying method and principle of applying liquid, proximal portions may be included.

There is no particular limitation on the applying method. For example, the method includes application using a brush, a blade and the like; dipping; printing; spraying liquid; and projection. These methods may be used in combination. Accordingly, after applying liquid A by a brush on the lower edges and lateral sides, the anode substrate including face portions may be dipped into liquid B, or after dipping the anode substrate into liquid A so that liquid A is applied only to the lower edges, the anode substrate including face portions may be dipped into liquid B.

Liquid A and liquid B can be described as common in terms of composition containing materials for forming the second coating layer, but are different in that wettability on the first coating layer is higher in liquid B than in liquid A. Here, liquid having high wettability means that the liquid for forming the second layer spreads more easily when an equal amount of the liquid is deposited on the first layer under the same conditions. Wettability can be adjusted by various methods depending on the composition of the first and second layers.

A method for increasing such wettability includes composing liquid for forming the second layer by using a solvent or component having higher affinity for the first layer, or by having higher content of such solvent or component. For example, when the first layer is a carbon paste layer and the second layer is an electroconductive paste layer, the electroconductive layer may be made up by using a solvent having higher lipophilicity in liquid B than in liquid A; by increasing the content of the solvent in liquid B than in liquid A even if the same solvent is used; or by decreasing the content of fluorine resin which is often contained in electroconductive paste in liquid B than in liquid A. The method for adjusting the wettability is not particularly limited and, for example, it may be effective in some cases to add a viscous component to liquid A so as to make the fluidity of liquid A lower than that of liquid B.

As discussed in above, the present invention enables to control the composition or the layer thickness of the second layer on the side (edge) part and on the face part independently. As a result, a desired layer thickness on the side (edge) part can be secured while the increase of the layer thickness on the face part can be suppressed. Consequently, the present invention is suitable for use in a solid electrolytic capacitor element (in FIG. 3), wherein it is preferable that the electroconductive paste layer formed on the anode substrate having a carbon paste layer on the surface is relatively thick on the side (edge) portions while the layer is relatively thin on the face portions, and a production method thereof. That is, according to the present invention, a solid electrolytic capacitor element having sufficiently low equivalent series resistance (ESR) and high capacitance per unit volume can be obtained by controlling the composition or the thickness of the silver paste layer covering the side (edge) portions (4b) and those of a silver paste layer covering the face portions (4b) of the anode substrate (1) on the surface of which an oxide film layer (2), an electroconductive polymer layer (3) and a carbon paste layer (4a) are sequentially laminated in an element for a solid electrolytic capacitor comprising an oxide film layer (2), an electroconductive polymer layer (3), a carbon paste layer (4a) and a silver paste layer (4b) sequentially formed on the surface of an anode substrate (1) comprising a valve-acting metal material. According to the present invention, a solid electrolytic capacitor element having low equivalent series resistance (ESR) and high capacitance per unit volume can be obtained, wherein the layer thickness of the silver paste (4b) coating the side (edge) portions is sufficiently secured while the silver paste (4b) coating the face portions is suppressed. A solid electrolytic capacitor element is preferable wherein a desired laminated structure is formed by applying liquid A containing materials for forming a silver paste layer (4b) on the anode substrate having a carbon paste layer (4a) on the surface on the side (edge) portions of the anode substrate, and by applying liquid B having higher wettability than liquid A on the face portions of the anode substrate. A solid electrolyte capacitor element in which a desired laminated structure is formed can be produced by applying liquid A on the side (edge) portions of the anode substrate, drying it and then applying liquid B on the face portions of the anode substrate by dipping the anode substrate into liquid B. A solid electrolytic capacitor element having a desired laminated structure can be produced by applying liquid A by dipping only the lower end (edge) portion of the anode substrate into liquid A, drying it and then applying liquid B by dipping the anode substrate including the face portions into liquid B. Or, such a capacitor element can be produced by applying liquid B on the face portions of the anode substrate, drying it and then coating the side (edge) portions of the anode substrate with liquid A by dipping the anode substrate into liquid A. Even if at least one of the carbon paste layer (4a) and a silver paste layer (4b) is a coating layer comprising fluorine resin, a solid electrolytic capacitor element having sufficiently low equivalent series resistance (ESR) and high capacitance per unit volume can be obtained, wherein the layer thickness of the silver paste layer (4b) coating the side (edge) part is sufficiently secured while the silver paste layer (4b) on the face part is suppressed. The present invention provides an element for a solid electrolytic capacitor having low ESR and high capacitance, a solid electrolytic capacitor comprising the solid electrolytic capacitor element, and a laminated solid electrolytic capacitor produced by laminating a plurality of the solid electrolytic capacitor elements.

Figure 3:
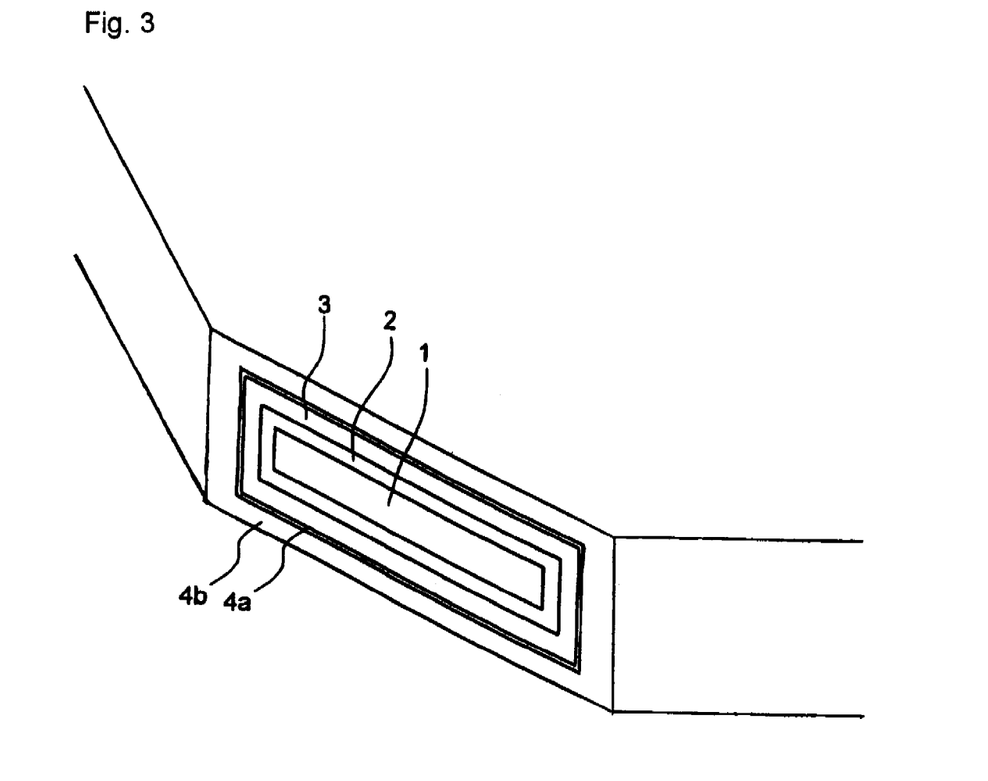
[FIG. 3] A view showing a frame format of the silver paste coating structure in the solid electrolytic capacitor element of the present invention

The solid electrolytic capacitor element as described in FIG. 3 is an element wherein a dielectric oxide film layer (2) is formed on the anode substrate (1), and a solid semiconductor layer (hereinafter called "solid electrolyte") (3) is formed outside the dielectric layer as a counter electrode, and a conductor layer (4) such as an electroconductive paste is further formed, which conductor layer (4) has a two-layer structure typically comprising a carbon paste layer (4a) and an electroconductive layer (4b), wherein a desired thickness of the electroconductive layer on the side (edge) portions is secured while that on the face portions is suppressed.

In the solid electrolytic capacitor and a method for producing the same of the present invention, an oxide film layer, an electroconductive polymer layer, a carbon paste layer and a silver paste layer are sequentially laminated on the surface of an anode substrate comprising a valve-acting metal.

The anode substrate comprising a valve-acting metal on the surface of which an oxide film layer is laminated includes all those with conditions on dimensions which make a difference in the thickness of a silver layer on the face portions and on the side (edge) portions when applying silver paste onto the carbon paste layer laminated on the electroconductive polymer layer formed on the oxide film layer. Here, "side (edge)" indicates three lines including the edge lines opposing the anode and the side line crossing the edge lines at right angles. The components of the carbon paste layer and the silver paste layer are not particularly limited.

In a solid electrolytic capacitor element comprising an oxide film layer, an electroconductive polymer layer, a carbon paste layer and a silver paste layer sequentially formed on the surface of an anode substrate comprising valve-acting metal and a production method thereof, the present invention is characterized in the silver paste layer constituting the above laminated structure. That is, the present invention enables to obtain a solid electrolytic capacitor element having low equivalent series resistance (ESR) and high capacitance per unit volume by controlling the composition or the thickness of the silver paste layer covering the side (edge) portions and those of a silver paste layer covering the face portions of the anode substrate on the surface of which an oxide film layer, an electroconductive polymer layer and a carbon paste layer are sequentially laminated. In a specific embodiment of the present invention, a silver paste layer covering the side (edge) portions of the anode substrate is thicker than that covering the face portions, or has a thickness of 10 μm or more, preferably has a thickness of about 10 to 200 μm. Also, a specific embodiment of the present invention is characterized in the method for producing a capacitor comprising a step of dipping the anode substrate on the surface of which an oxide film layer, an electroconductive polymer layer and a carbon paste layer are sequentially laminated into silver paste and a step of applying silver paste by a brush on the side (edge) portions of the anode substrate.

A method for forming a silver paste layer coating the face portions of the anode substrate on the surface of which an oxide film layer, an electroconductive polymer layer and a carbon paste layer are sequentially laminated includes known methods usually used for forming a paste layer; for example, a dipping method in which the face of the anode substrate to be coated is dipped in silver paste in a storage tank and then pulled out, a method of contacting a brush containing the paste to the face of the anode substrate, a method of misting the paste by a spray to the face of the anode substrate, a method of applying the paste by pushing a roller on which a paste is attached to the face of the anode substrate and a screen-print method in which paste is dropped onto the face of the anode substrate through a mesh.

As a method for forming a silver paste layer coating the edge portions of the anode substrate on the surface of which an oxide film layer, an electroconductive polymer layer and a carbon paste layer are sequentially laminated, an appropriate method for coating the edge portions can be selected among the known methods usually used for forming a paste layer, such as a dipping method in which the edge of the anode substrate to be coated is dipped in silver paste in a storage tank and then pulled out, a method of contacting a brush containing the paste to the edge of the anode substrate and a method of misting the paste by a spray to the edge of the anode substrate.

Thus, a method for forming a silver paste coating the face portions or the side (edge) portions of the anode substrate on the surface of which an oxide film layer, an electroconductive polymer layer and a carbon paste layer are sequentially laminated is not particularly limited as long as the objective of the present invention can be achieved. That is, the method for forming the silver paste layer includes, for example, application by a brush and a blade, dipping, screen-printing, spraying of liquid and projection. These methods may be used in combination. Accordingly, a silver paste layer may be formed by applying the paste with a brush only to the lower side and lateral side of the anode substrate followed by dipping the anode substrate including face portions into the paste, or by dipping only the lower side of the anode substrate into the paste followed by dipping the anode substrate including face portions into the paste. According to these methods, a solid electrolyte capacitor element of the present invention can be produced, wherein a silver paste layer covering the side (edge) portions of the anode substrate is thicker than that covering the face portions, or has a thickness of 10 μm or more.

In the method for producing a capacitor comprising a step of dipping the anode substrate on the surface of which an oxide film layer, an electroconductive polymer layer and a carbon paste layer are sequentially laminated into silver paste and a step of applying silver paste with a brush on the side portions of the anode substrate, a step of applying silver paste to the portion including the faces or the whole of the anode substrate by a dipping method and a step of applying silver paste with a brush to the side portions can be performed together. Consequently, the thickness of a silver paste layer does not vary greatly and therefore a capacitor can be produced having high capacitance per unit volume and low ESR.

In the present invention, after laminating an electroconductive polymer layer on the oxide film layer formed on the surface of the anode substrate comprising valve-acting metal, a carbon paste layer and a silver paste layer are sequentially laminated thereon. After forming an electroconductive polymer layer, the anode substrate may be subjected to electric re-formation, if desired, and a carbon paste layer can be laminated by applying carbon paste on the surface of the anode substrate through dipping the anode substrate into carbon paste and drying the paste. The carbon paste to be used generally has a composition containing carbon particles, fluorine resin and a solvent such as isoamyl acetate.

Silver paste is applied on the surface of the anode substrate on which a carbon paste layer is laminated by dipping the anode substrate into silver paste. The silver paste to be used generally has a composition containing silver particles, fluorine resin and a solvent such as isoamyl acetate. Though the shape of the silver particles to be applied is not particularly limited, a flake form is preferable.

The method of the present invention comprises a step of dipping the anode substrate on the surface of which an oxide film layer, an electroconductive polymer layer and a carbon paste layer are sequentially laminated into silver paste (dipping step) and a step of applying silver paste with a brush on the side (edge) portions of the anode substrate (brush application step), and either of the dipping step and the brush application step may be performed first. For example, after the dipping step of dipping the anode substrate into silver paste, the brush application step of applying silver paste with a brush on the side portions of the anode substrate is performed as described above. The brush to be used is not specifically limited, but a paint brush is preferable and commercially available paint brushes can be used. The thickness of the silver paste layer obtained by drying the paste is preferably 10 μm or more, more preferably 10 to 200 μm on the side (edge) portions of the anode substrate.

After laminating, for example, two of the anode substrates on which an oxide film layer, an electroconductive polymer layer, a carbon paste layer and a silver paste layer are thus sequentially formed on a lead frame, the part of the anode substrate on which an oxide film layer, an electroconductive polymer layer, a carbon paste layer and a silver paste layer are not formed is welded to the lead frame, and a solid electrolyte capacitor chip is produced by encapsulating the laminated anode substrates with epoxy resin.

The solid electrolytic capacitor of the present invention will be described in detail herein below.

[Valve-Acting Metal]

In the solid electrolytic capacitor and the method for producing the same of the present invention, an oxide film layer, an electroconductive polymer layer, a carbon paste layer and a silver paste layer are sequentially laminated on the surface of an anode substrate comprising valve-acting metal. In the present invention, the valve-acting metal to be used for an anode substrate of a solid electrolytic capacitor may be, for example, any of aluminum, tantalum, titanium, niobium, zirconium, alloy thereof and the like. The shape of an anode substrate includes a plate-shaped foil, a plate and a rod. The anode substrate comprising valve-acting metal on the surface of which an oxide film layer is laminated includes all those with conditions on dimensions which make a difference in the thickness of the silver paste layer on the face portions and on the side (edge) portions when applying silver pastes layer on the carbon paste layer on top of the electroconductive polymer layer laminated on the oxide film layer of the anode substrate. Practically, a chemically-formed aluminum foil is commonly used due to its economic advantage. The chemically-formed aluminum foil to be used is rectangular in shape 40 to 200 μm in thickness and about 1 to 30 mm in width and length as a unit of a plate element. Preferably, the foil is 2 to 20 mm in width and 2 to 20 mm in length, more preferably 2 to 5 mm in width and 2 to 6 mm in length.

The dielectric film layer provided on the surface of the anode substrate may be an oxide layer of the valve-acting metal on the surface of which the oxide layer is provided or may be another dielectric layer provided on the surface of valve-acting metal or a valve-acting metal foil. However, particularly, the dielectric film layer is preferably a layer comprising an oxide of the valve-acting metal.

A portion at the end of the plate-shaped anode substrate on the surface of which a dielectric layer is formed may be made as an anode part while the rest is made as a cathode part. An insulating resin zone (a masking) may be used to divide the anode and cathode parts.

[Solid Electrolyte]

Next, solid electrolyte is formed on the dielectric film layer of the cathode part. The kind of the solid electrolyte layer is not particularly limited and conventionally known solid electrolyte can be used. A solid electrolytic capacitor produced using highly-conductive polymer as solid electrolyte is particularly preferable since it has a lower amount of components which may cause an increase in equivalent series resistance, high capacitance in a small size and excellent high-frequency property compared to a wet electrolytic capacitor using a conventional electrolytic solution or a solid electrolytic capacitor using dioxide manganese.

There is not a particular limit on the electroconductive polymer constituting the solid electrolyte used for a solid electrolytic capacitor of the present invention, but a preferred example includes an electroconductive polymer having a pi-conjugated system structure such as an electroconductive polymer containing as a repeating unit a structure represented by a compound having a thiophene skeleton, a compound having a polycyclic sulfide skeleton, a compound having a pyrrole skeleton and a furan skeleton.

As a monomer used for a material of the electroconductive polymer, examples of compound having a thiophene skeleton include derivatives of 3-methylthiophene, 3-ethylthiophene, 3-propylthiophene, 3-butylthiophene, 3-pentylthiophene, 3-hexylthiophene, 3-heptylthiophene, 3-octylthiophene, 3-nonylthiophene, 3-decylthiophene, 3-fluorothiophene, 3-chlorothiophene, 3-bromothiophene, 3-cyanothiophene, 3,4-dimethylthiophene, 3, 4-diethylthiophene, 3, 4-butylenethiophene, 3,4-methylenedioxythiophene, and 3,4-ethylenedioxythiophene. These compounds are commercially available or can be prepared by known methods (for example, described in Synthetic Metals, 1986, Vol. 15, Page 169).

Examples of compound having a polycyclic sulfide skeleton include compounds having a 1,3-dihydro polycyclic sulfide (also called 1,3-dihydrobenzo[c]thiophene)skeleton and compounds having a 1,3-dihydronaphtho[2,3-c]thiophene skeleton. Further, examples include compounds having a 1,3-dihydroanthra[2,3-c]thiophene skeleton, and compounds having 1,3-dihydro-naphthaceno[2,3-c]thiophene skeleton. These compounds can be prepared by a known method, for example, the method described in JP-A-8-3156.

In addition, for example, compounds having a 1,3-dihydronaphtho[1,2-c]thiophene skeleton, 1,3-dihydrophenanthra[2,3-c]thiophene derivatives, compounds having a 1,3-dihydrotriphenylo[2,3-c]thiophene skeleton and 1,3-dihydrobenzo[a]anthraceno[7,8-c]thiophene derivatives can be used.

Compounds optionally containing nitrogen or N-oxide in the condensed ring may also be used, and examples thereof include 1,3-dihydrothieno[3,4-b]quinoxaline, 1,3-dihydrothieno[3,4-b]quinoxaline-4-oxide and 1,3-dihydrothieno[3,4-b]quinoxaline-4,9-dioxide, however, the present invention is not limited thereto.

Examples of the compound having a pyrrole skeleton include derivatives such as 3-methylpyrrole, 3-ethylpyrrole, 3-propylpyrrole, 3-butylpyrrole, 3-pentylpyrrole, 3-hexylpyrrole, 3-heptylpyrrole, 3-octylpyrrole, 3-nonylpyrrole, 3-decylpyrrole, 3-fluoropyrrole, 3-chloropyrrole, 3-bromopyrrole, 3-cyanopyrrole, 3,4-dimethylpyrrole, 3,4-diethylpyrrole, 3,4-butylenepyrrole, 3,4-methylenedioxypyrrole and 3,4-ethylenedioxypyrrole, however, the present invention is not limited thereto. These compounds are commercially available or may be prepared by a known method.

Examples of the compound having a furan skeleton include derivatives such as 3-methylfuran, 3-ethylfuran, 3-propylfuran, 3-butylfuran, 3-pentylfuran, 3-hexylfuran, 3-heptylfuran, 3-octylfuran, 3-nonylfuran, 3-decylfuran, 3-fluorofuran, 3-chlorofuran, 3-bromofuran, 3-cyanofuran, 3,4-dimethylfuran, 3,4-diethylfuran, 3,4-butylenefuran, 3,4-methylenedioxyfuran and 3,4-ethylenedioxyfuran, however, the present invention is not limited thereto. These compounds are commercially available or may be prepared by a known method.

The method for polymerization may be electrolytic polymerization, oxidative polymerization or a combination thereof. Also, after forming a solid electrolyte which is not an electroconductive polymer on the dielectric layer, an electroconductive polymer may be formed by the above-mentioned method of polymerization.

An example of a method for forming an electroconductive layer includes a forming method by applying monomer of 3,4-ethylenedioxythiophene and an oxidizing agent, preferably in the form of a solution, separately in tandem or concurrently on a dielectric film layer (JP-A-H2-15611 and JP-A-H10-32145).

A compound capable of doping (dopant) is generally used for an electroconductive polymer. A dopant may be added to either of a monomer solution and an oxidizing agent solution. Or a compound wherein a dopant and an oxidizing agent are united as one such as an organic metal salt of sulfonic acid may be used. An aryl sulfonate compound is preferably used as a dopant. For example, salts of such as benzenesulfonic acid, toluenesulfonic acid, naphthalenesulfonic acid, anthracenesulfonic acid and anthraquinonesulfonic acid may be used.

The thus produced solid electrolyte has an electric conductivity within a range of about 0.1 to about 200 S/cm, preferably about 1 to about 150 S/cm, more preferably about 10 to about 100 S/cm.

[Carbon Paste Layer]

In the present invention, after laminating an electroconductive polymer layer on the oxide film layer on the surface of an anode substrate comprising valve-acting metal, a carbon paste layer is laminated thereon. The carbon paste to be used generally has a composition comprising carbon particles, fluorine resin and a solvent such as isoamyl acetate. The components constituting the carbon paste layer are not particularly limited. After forming an electroconductive polymer layer, the anode substrate may be subjected to electric reformation, if desired, and a carbon paste layer can be laminated by applying carbon paste on the surface of the anode substrate through dipping the anode substrate into carbon paste having a composition as described above and drying the paste.

A method for forming a carbon paste layer onto the oxide film layer on the surface of the anode substrate on the surface of which an oxide film layer and an electroconductive polymer layer are sequentially laminated includes known methods usually used for forming a paste layer such as a dipping method, a brush application method, a spraying method, a roller method and a screen-printing method. That is, as a method for laminating an electroconductive polymer layer on the anode substrate having an oxide film layer on the surface and forming a carbon paste layer thereon includes a dipping method in which the anode substrate having an oxide film layer on the surface and an electroconductive layer laminated thereon is dipped in carbon paste and then pulled out, a method of contacting a brush containing the paste to the anode substrate, a method of misting carbon paste by a spray to the anode substrate, a method of applying carbon paste by pushing a roller on which the paste is attached to the anode substrate, and a screen-print method in which carbon paste is dropped onto the anode substrate through a mesh.

[Silver Paste Layer]

After a carbon paste layer is laminated, a silver paste layer is laminated thereon. In a preferred embodiment of the present invention, the silver paste has a composition of silver particles, fluorine resin, a solvent such as isoamyl acetate and water of 0.5 mass % or less, preferably 0.3 mass % or less. Though the shape of the silver particles to be applied is not particularly limited, a flake form is preferable. The present invention is characterized in the silver paste layer constituting a laminated structure. That is, the solid electrolytic capacitor of the present invention is characterized in that the silver paste has a water content of 0.5 mass % or less, particularly 0.3 mass % or less, which silver paste coats the anode substrate comprising an oxide film layer, an electroconductive polymer layer and a carbon paste layer sequentially laminated on the surface. The water content of the silver paste is 0.5 mass % or less, preferably 0.3 mass % or less. It may be 0.05 mass % or less, and most preferably 0.02 mass % to 0.3 mass %.

The silver paste of the present invention usually comprises silver particles, fluorine resin and a solvent such as isoamyl acetate, and can be prepared by mixing these components. The mass ratio of these components used for preparing the silver paste is usually 45 to 65 mass % for silver particles, 1 to 10 mass % for fluorine resin, 30 to 50 mass % for a solvent such as isoamyl acetate in the total silver paste. An organic solvent is generally used as a solvent to be added to the silver paste, however, the organic solvent may absorb water content in the air, which may result in the increase of the water content of the silver paste. And when the silver paste having an increased water content is laminated in a solid electrolytic capacitor, ESR of the capacitor cannot be sufficiently low. Therefore, it is preferable to use an organic solvent adjusted to have a water content of 0.5 mass % or less. If it is necessary to dehydrate the organic solvent, the solvent can be dehydrated by using a dehydrating agent such as zeolite or by using a polymer membrane which allows water to pass through readily and hardly allows an organic solvent to pass. By these methods, the water content of the organic solvent can be lowered, thereby enabling to prepare silver paste having a water content of 0.5 mass % or less, preferably 0.3 mass % or less.

It is preferable to store the silver paste prepared to have a water content of 0.5 mass % or less, preferably 0.3 mass % or less, in an airtight container such as a desiccator in which humidity is regulated from 30 to 60%, preferably 30 to 50%, more preferably 30 to 40% or less, and a drying agent such as silica gel may coexist. Storing temperature is preferably 15 to 30° C., more preferably 21 to 27° C., still more preferably 23 to 25° C. or even lower. If the storage humidity is 70% or higher, even in an environment at a temperature of 15 to 30° C., the water content of the silver paste having the above-mentioned composition may increase exceeding 0.5 mass % in some cases, and the effects of lowering ESR in the present invention may fail to be achieved.

The silver paste having the above-mentioned composition of the present invention forms a laminated structure by application and the like. The silver paste layer covering the side (edge) portions of the anode substrate is thicker than that covering the face portions, or has a thickness of 10 μm or more, preferably has a thickness of about 10 to 200 μm. The method for producing the solid electrolytic capacitor of the present invention preferably comprises a step of dipping the anode substrate on the surface of which an oxide film layer, an electroconductive polymer layer and a carbon paste layer are sequentially laminated into silver paste having the above-mentioned composition and a step of applying silver paste with a brush on the side portions of the anode substrate.

In a solid electrolytic capacitor comprising an oxide film layer, an electroconductive polymer layer, a carbon paste layer and a silver paste layer sequentially formed on the surface of an anode substrate comprising valve-acting metal, when silver paste layer covering the side (edge) portions of the anode substrate is thicker than that covering the face portions, or has a thickness of 10 μm or more, it is preferable as one can obtain a solid electrolytic capacitor element having low equivalent series resistance (ESR) and high capacitance per unit volume, wherein a sufficient layer thickness on the side (edge) part is secured while the increase of the layer thickness on the face part is suppressed.

In the method for producing a solid electrolytic capacitor comprising an oxide film layer, an electroconductive polymer layer, a carbon paste layer and a silver paste layer sequentially formed on the surface of an anode substrate comprising valve-acting metal, comprising a step of dipping the anode substrate on the surface of which an oxide film layer, an electroconductive polymer layer and a carbon paste layer are sequentially laminated into the silver paste having the above-mentioned composition and a step of applying silver paste by a brush on the side portions of the anode substrate, a step of applying silver paste to the portion including the faces or the whole of the anode substrate by a dipping method and a step of applying silver paste with a brush to the side portions can be performed together. Consequently, the thickness of a silver paste layer does not vary greatly and therefore a capacitor can be produced having high capacitance per unit volume and low ESR.

With respect to the step of dipping the anode substrate on the surface of which an oxide film layer, an electroconductive polymer layer and a carbon paste layer are sequentially laminated into silver paste (dipping step) and a step of applying silver paste with a brush on the side portions of the anode substrate (brush application step), either of the steps may be performed first. For example, after the dipping step of dipping the anode substrate into silver paste, the brush application step of applying silver paste with a brush on the side portions of the anode substrate is performed as described above. The brush to be used is not specifically limited, but a paint brush is preferable and commercially available paint brushes can be used. The thickness of the silver paste layer obtained by drying the paste is preferably 10 μm or more, more preferably 10 to 200 μm on the side (edge) portions of the anode substrate.

A method for forming a silver paste layer of the above-mentioned composition coating the face portions of the anode substrate on the surface of which an oxide film layer, an electroconductive polymer layer and a carbon paste layer are sequentially laminated includes known methods usually used for forming a paste layer; for example, a dipping method in which the portion of the anode substrate to be coated is dipped in silver paste in a storage tank and then pulled out, a brush application method of contacting a brush containing the silver paste to the portion of the anode substrate, a spraying method of misting the silver paste by a spray to the portion of the anode substrate, a method of applying the silver paste by pushing a roller on which a paste is attached to the portion of the anode substrate and a screen-print method in which the silver paste is dropped onto the portion of the anode substrate through a mesh.

As a method for forming a silver paste layer coating the edge portions of the anode substrate on the surface of which an oxide film layer, an electroconductive polymer layer and a carbon paste layer are sequentially laminated, an appropriate method for coating the edge portions can be selected from those such as a dipping method in which the edge of the anode substrate to be coated is dipped in the silver paste in a storage tank and then pulled out, a brush application method of contacting a brush containing the silver paste to the edge of the anode substrate and a spraying method of misting the silver paste by a spray to the edge of the anode substrate.

Thus, a method for forming a silver paste of the above-mentioned composition coating the face portions and/or the side (edge) portions of the anode substrate on the surface of which an oxide film layer, an electroconductive polymer layer and a carbon paste layer are sequentially laminated is not particularly limited as long as the objective of the present invention can be achieved. That is, the method for forming the silver paste layer includes, for example, application by a brush and a blade, dipping, screen-printing, spraying of liquid and projection. These methods may be used in combination and appropriate forming methods can be selected in individual cases. Accordingly, a silver paste layer may be formed by applying the paste with a brush only to the lower side and lateral side of the anode substrate followed by dipping the anode substrate including face portions into the paste, or by dipping only the lower side of the anode substrate into the paste followed by dipping the anode substrate including face portions into the paste. According to these methods, a solid electrolyte capacitor element of the present invention can be produced, wherein a silver paste layer covering the side (edge) portions of the anode substrate is thicker than that covering the face portions, or has a thickness of 10 μm or more.

[Solid Electrolytic Capacitor]

The solid electrolytic capacitor element thus obtained usually is connected with a lead terminal and provided with a resin mold, a resin case, an exterior case made of a metal, or an exterior by resin dipping or the like, to give capacitor products for various purposes. Also, the elements may be laminated and then encapsulated. That is, for example, after two to four anode substrates on which an oxide film layer, an electroconductive polymer layer, a carbon paste layer and a silver paste layer are sequentially formed are laminated on a lead frame, the part of the anode substrate on which an oxide film layer, an electroconductive polymer layer, a carbon paste layer and a silver paste layer are not formed is welded to the lead frame, connected with a lead terminal and provided with a resin mold, a resin case, an exterior case made of a metal, or an exterior by epoxy resin dipping or the like, to give laminated solid electrolytic capacitor products for various purposes.

EXAMPLES

Hereinafter, representative examples of the present invention are presented and the present invention will be explained in more detail. It should be noted that these examples are merely exemplary and the present invention should not be construed as being limited thereto.

In the following examples, equivalent series resistance (ESR) was measured at 100 kHz using LCR meter 4284A produced by Hewlett-Packard Company.

Example 1

A masking (heat resistant resin) with a width of 1 mm was formed circumferentially on a chemically formed aluminum foil 3.5 mm in short axis direction, 10 mm in long axis direction and about 100 μm in thickness (hereinafter called "chemically formed foil") to divide the foil into a cathode part and an anode part. The cathode part, which is the edge portion of the chemically formed foil, was chemically formed by energization in an electrolytic solution and washed with water. Next, the cathode part was immersed into in 1 mol/l isopropyl alcohol solution containing 3,4-ethylenedioxythiophene dissolved therein, and then immersed into a mixed solution of an oxidizing agent (ammonium persulfate) and a dopant (sodium naphthalene-2-sulfonate) to be subjected to oxidation polymerization. The step of immersing and the step of polymerization are repeatedly performed thereby to form a solid electrolyte layer containing a dopant in the fine pores of the chemically formed foil. The chemically formed foil, wherein a solid electrolyte layer containing a dopant is formed, was washed with water to form a solid electrolyte layer and then dried in hot air. Carbon paste was deposited thereon to coat the foil so as to form a material for an element.

Meanwhile, 85 mass % of silver particles and 15 mass % of Viton rubber powder (fluorine-containing rubber comprising a copolymer of vinylidene fluoride-4 ethylene fluoride-6 propylene fluoride) were mixed to serve as a solid content making up electroconductive paste. Isoamyl acetated was added thereto as a solvent, and the whole was kneaded to prepare a viscous silver paste having a composition of 70 mass % solid content (liquid A; hereinafter called "first composition"). Also, another silver paste was prepared in the same way as liquid A except that it has a composition of 60 mass % solid content (liquid B; hereinafter called "second composition"). Each silver paste of the first and second composition was put dropwise onto the carbon paste layer of the element material to determine the wettability, and it was confirmed that the wettability was lower in the first composition than in the second composition.

The material for an element was prepared by keeping the cathode side down on the supporting member, and was brought down to the silver paste tank containing the silver paste of the above first composition (liquid A) so as to immerse 0.5 mm of the cathode end (only the lower end) of the element material into the silver paste. Then the supporting member was raised to pull out the element material from the liquid and dried in hot air. Subsequently, the supporting member was brought down to immerse 3.3 mm of the cathode side of the element material into the silver paste of the above second composition (liquid B) and after a certain period the supporting member was raised to pull out the element material from the liquid and dried.

Example 2

The element material which was laid on the supporting member keeping the cathode side down was prepared in the same way as in Example 1, and the above-mentioned silver paste (liquid A; first composition) was applied on the edge (entire margin) of the cathode part and dried, and then the supporting member was brought down to the paste tank containing the silver paste (liquid B; second composition) to immerse 3.3 mm of the end part of the cathode side of the element material into the silver paste. Then the supporting member was raised to pull out the element material from the liquid and dried.

Example 3

The element material which was laid on the supporting member keeping the cathode side down was prepared in the same way as in Example 1, and the above-mentioned silver paste (liquid B; second composition) was applied on the face of the cathode part and dried, and then the supporting member was brought down to the paste tank containing the silver paste (liquid A; first composition) to immerse 0.5 mm of the end part (only the lower end) of the cathode side of the element material into the silver paste. Then the supporting member was raised to pull out the element material from the liquid and dried.

Comparative Example 1

The silver paste layer was formed in the same way as in Example 1 except that the silver paste of the first composition was used instead of that of the second composition.

Comparative Example 2

The silver paste layer was formed in the same way as in Example 1 except that the silver paste of the second composition was used instead of that of the first composition.

The capacitor elements produced in the above Examples and Comparative Examples were cut off from the supporting member and the thickness of the silver paste layer was observed under a microscope. The results are shown in Table 1.

Four sheets of the capacitor elements produced in Example 1 were laminated on a lead frame to obtain 50 units of a solid electrolytic capacitor having the rating capacity of 220 µF and rated voltage of 2V. Four sheets of the capacitor elements produced in Comparative Examples were also laminated on a lead frame to obtain 50 units of a solid electrolytic capacitor having the rating capacity of 220 µF and rated voltage of 2V. Both of 50 units of a solid electrolytic capacitor were soldered on the substrate using a reflow furnace at a temperature of 250° C. and equivalent series resistance (ESR) was measured. The results are shown in Table 1. In the table, qualifying standard for equivalent series resistance was set to 9 mΩ or lower, and the value of more than 8 mΩ and 9 mΩ or lower was indicated by the "P" mark, and the particularly favorable value (8 mΩ or lower) was indicated by the "S" mark. The value failing to satisfy the qualifying standard (exceeding 9 mΩ) was indicated by the "F" mark as unacceptable. The laminated layer thickness means the thickness of the laminated body of the four capacitor elements laminated on a lead frame.

TABLE 1

| Example | Thickness of a silver paste layer (µm) | | | ESR (equivalent series resistance) | |
| --- | --- | --- | --- | --- | --- |
| | On face portion | On lower end | On lateral side | Average value (mΩ) | Thickness of laminated layer (µm) |
| Example 1 | 15 | 15 | 2 | 8.2 P | 1000 |
| Example 2 | 15 | 15 | 15 | 7.0 S | 1000 |
| Example 3 | 15 | 15 | 2 | 8.8 P | 1000 |
| Comparative Example 1 | 40 | 15 | 2 | 8.5 P | 1200 |
| Comparative Example 2 | 15 | 4 | 2 | 12.1 F | 1000 |

The pattern for forming a silver paste layer in each example of Table 1 is as follows:
Example 1: paste having low wettability (on lower end only) + paste having high wettability
Example 2: paste having low wettalibity (on entire end) + paste having high wettability
Example 3: paste having high wettability + paste having low wettability (on lower end only)
Comparative Example 1: paste having low wettability (on lower end only) + paste having low wettability
Comparative Example 2: pate having high wettability (on lower end only) + paste having high wettability As in Comparative Example 1, when the silver paste having low wettability to the face and lower end portions, the capacitor grows in the laminated layer thickness. Accordingly, the capacitor having high capacitance per unit volume cannot be produced. Meanwhile, when the silver paste having high wettability to the face and lower end portions, ESR of the capacitor produced thereof becomes high. Therefore, as in Example 1, by applying the silver pastes having low wettability and high wettability to the lower end portion and the face portion, respectively, a capacitor suppressed in the laminated layer thickness can be suppressed, which has high capacitance per unit volume and low ESR.

As seen in the above-mentioned examples, according to the production method of the present invention, electric properties of the capacitor, particularly in terms of ESR, can be improved, and the capacitor is also remarkably improved in terms of the laminated layer thickness. That is, as seen in the above-mentioned examples, according to the present invention, a solid electrolytic capacitor element having low equivalent series resistance (ESR) and high capacitance per unit volume can be obtained by controlling the layer thickness in the edge portion and the face portion when forming a laminated structure of silver paste on the anode substrate. Particularly, the present invention enables to produce a capacitor element in which equivalent series resistance (ESR) is stably reduced and the thickness of the element is reduced. By using two kinds of silver paste having a composition of different wettability on the carbon paste layer and applying one having lower wettability and the other having higher wettability on the side (edge) portions and the face portions of the anode substrate, respectively, a desired layer thickness as a whole can be attained.

Example 4

An aluminum foil having been etched to increase the surface area was cut into rectangular pieces of 3 mm×10 mm. The lower half of each of the rectangular aluminum foil pieces and an electrode were immersed in 10% aqueous ammonium adipate solution at a temperature of 80° C. and a voltage of 3 V was applied between the aluminum foil and the electrode for 10 minutes to chemically form the aluminum foil to thereby form a dielectric oxide film consisting of aluminum oxide on the surface of each of the lower half of the aluminum foil pieces.

Then, an electroconductive polymer layer consisting of poly(3,4-ethylenedioxythiophene) was attached on the dielectric film by repeating a step of immersing the chemically formed aluminum foil in an isopropyl alcohol containing 3,4-ethylenedioxythiophene dissolved therein, followed by drying, and a step of immersing the chemically formed aluminum foil in an aqueous solution containing sodium anthraquinone sulfonate and ammonium persulfate dissolved therein, followed by drying.

Furthermore, the aluminum foil having the electroconductive polymer layer formed thereon and an electrode were immersed in 10% aqueous ammonium adipate solution to perform chemical reformation of the dielectric layer by applying a voltage of 3 V to the aluminum foil and the electrode for one minute. Carbon paste was applied on the surface of the aluminum foil by immersing the chemically reformed aluminum foil into carbon paste composed of 7% by mass of carbon particles, 3% by mass of fluorine resin and 90% by mass of isoamyl acetate. The viscosity of the carbon paste was 60 cpoise. The carbon particles applied were composed of those having two different diameter ranges, one is from 10 to 100 nm and the other from 0.8 to 8 µm, and the mass ratio of the two types was 30 to 70. After drying at 130° C. for 10 minutes, the carbon paste layer had a thickness of 5 µm and 70% by mass of carbon particles was contained in the carbon paste layer.

Next, silver paste was applied on the surface of the aluminum foil by immersing the aluminum foil coated with carbon paste into silver paste composed of 54% by mass of silver particles, 6% by mass of fluorine resin and 40% by mass of isoamyl acetate was applied. The viscosity of the silver paste was 400 cpoise. The coating silver particles were in flake form and each having a longitudinal length of from 1 to 5 µm. After drying at 130° C. for 10 minutes, the silver paste layer had a thickness of 15 µm and 90% by mass of silver particles was contained in the silver paste layer.

After applying silver paste on the aluminum foil by a dipping method, the silver paste used in the dipping method was applied with a brush on the side portions of the aluminum foil, followed by drying at 130° C. for ten minutes.

For the brush application, after immersing a commercially available brush for painting watercolors (tip length: about 2 cm) into silver paste and pressing the paint brush to the wall of the paste container to sufficiently extract the paste, the brush was made to touch lightly on the side portions of the foil and move parallel to the side portions to thereby apply a slight amount of silver paste in the vicinity of the side portions (within 1 mm from the side).

The aluminum foil coated with silver paste was embedded into a curing resin consisting of two-liquid mixture, the cured resin was cut into pieces 1 mm wide, and the cut surface of the aluminum foil was observed to measure the thickness distribution of the silver paste layer on the face portion of the aluminum foil. The result showed that the thickness of the silver paste layer was 15 µm on most part. The result of measuring the thickness of the silver paste layer on the side portions of the aluminum foil showed was 23 to 38 µm.

Two sheets of the aluminum foil each having an aluminum oxide layer, an electroconductive polymer layer, a carbon paste layer and a silver paste layer sequentially formed thereon were stacked on a lead flame. The portions on which no aluminum oxide layer, electroconductive polymer layer, carbon paste layer or silver paste layer had been formed were welded to the lead flame. The thus stacked aluminum foil sheets were sealed with an epoxy resin to thereby produce a chip capacitor.

As a result of evaluations by a LCR meter, capacitance of the obtained capacitor was 102.6 µF at 120 Hz, ESR value was 7.4 mΩ at 100 kHz. As a result of measuring a leakage current by applying a voltage of 2V to 100 units of capacitor, all of the 100 units had a leakage current of 5 µA or less.

Example 5

After applying silver paste on the aluminum foil by a dipping method, the silver paste used in the dipping method was applied with a dispenser on the side portions of the aluminum foil, followed by drying at 130° C. for ten minutes as in the same way as in Example 4. The silver paste layer having almost uniform thickness was applied on the edge portion of the foil with a dispenser by contacting the nozzle of the dispenser to the edge and by moving the dispenser parallel to the edge at uniform velocity and discharging silver paste at a constant speed. The result of measuring the thickness of the silver paste layer on the face portions and side portions of the aluminum foil was 14 to 18 µm and 25 to 34 µm, respectively.

Two sheets of the aluminum foil each having an aluminum oxide layer, an electroconductive polymer layer, a carbon paste layer and a silver paste layer sequentially formed thereon were stacked on a lead flame. The portions on which no aluminum oxide layer, electroconductive polymer layer, carbon paste layer or silver paste layer had been formed were welded to the lead flame. The thus stacked aluminum foil sheets were sealed with an epoxy resin to thereby produce a chip capacitor.

As a result of evaluations by a LCR meter, capacitance of the obtained capacitor was 101.5 µF at 120 Hz, ESR value was 7.4 mΩ at 100 kHz. As a result of measuring a leakage current by applying a voltage of 2V to 100 units of capacitor, all of the 100 units had a leakage current of 5 µA or less.

Comparative Example 3

On the aluminum foil on which an electroconductive polymer layer and a carbon paste layer were formed in the same way as in Example 4, the silver paste used in Example 4 was applied with a paint brush, after immersing the brush into the silver paste and without fully extracting the paste, the side of the brush was pressed on the side portions of the foil to thereby apply silver paste, followed by drying. The result of measuring the distribution of the thickness of the silver paste layer on the face portions of the aluminum foil was 8 to 55 µm.

Next, a capacitor chip was produced in the same way as in Example 4 and as a result of evaluations by a LCR meter, capacitance of the obtained capacitor was 103.3 µF at 120 Hz, ESR value was 7.7 mΩ at 100 kHz. As a result of measuring a leakage current by applying a voltage of 2V to 100 units of capacitor, all of the 100 units had a leakage current of 5 µA or less.

Comparative Example 4

The same silver paste as in Example 4 was applied by a dipping method on the aluminum foil on which an electroconductive polymer layer and a carbon paste layer were formed in the same way as in Example 4, followed by drying. The result of measuring the distribution of the thickness of the silver paste layer on the face portions of was 25 to 37 µm. Also, the result of measuring the thickness of the silver paste layer on the side portion of the aluminum foil was 12 to 40 µm.

Next, a capacitor chip was produced in the same way as in Example 4 and as a result of evaluations by a LCR meter, capacitance of the obtained capacitor was 103.3 µF at 120 Hz, ESR value was 25.7 mΩ at 100 kHz. As a result of measuring a leakage current by applying a voltage of 2V to 100 units of capacitor, all of the 100 units had a leakage current of 5 µA or less.

The results of evaluation on the capacitor obtained in Examples 4 and 5 and Comparative Examples 3 and 4 are shown in Table 2.

TABLE 2

| Example | Thickness of the silver paste layer on face portions (µm) | Thickness of the silver paste layer on side portions (µm) | ESR (mΩ) | Capacitance (µF) |
|---|---|---|---|---|
| Example 4 | 15* | 23-38 | 7.4 | 102.6 |
| Example 5 | 14-18 | 25-34 | 7.4 | 101.5 |
| Comparative Example 3 | 8-55 | — | 7.7 | 103.3 |
| Comparative Example 4 | 25-37 | 12-40 | 25.7 | 103.3 |

*The thickness of the silver paste was as thick as 23 to 38 µm only in the vicinity of the side portions, and 15 µm on most of the face portions.

As seen in the above-mentioned examples, according to the production method of the present invention, electric properties of the capacitor, particularly in terms of ESR, can be improved, and the capacitor is also remarkably improved in terms of the thickness distribution of the silver paste layer. That is, according to the present invention, one can obtain a solid electrolytic capacitor element having low equivalent series resistance (ESR) and high capacitance per unit volume, wherein a sufficient layer thickness on the side (edge) part is secured while the increase of the layer thickness on the face part is suppressed.

In the present invention, as seen in the above-mentioned examples, by the production method comprising a step of dipping the anode substrate on the surface of which an oxide film layer, an electroconductive polymer layer and a carbon paste layer are sequentially laminated into silver paste and a step of applying silver paste by a brush on the edge of the anode substrate, a capacitor can be produced, wherein the thickness of a silver paste layer does not vary greatly and therefore the capacitance per unit volume is high and ESR is low.

Example 6

An aluminum foil having been etched to increase the surface area was cut into rectangular pieces of 3 mm×10 mm. The lower half of each of the rectangular aluminum foil pieces and an electrode were immersed in 10% aqueous ammonium adipate solution at a temperature of 80° C. and a voltage of 3 V was applied between the aluminum foil and the electrode for 10 minutes to chemically form the aluminum foil to thereby form a dielectric oxide film consisting of aluminum oxide on the surface of each of the lower half of the aluminum foil pieces.

Then, an electroconductive polymer layer consisting of poly(3,4-ethylenedioxythiophene) was attached on the dielectric film by repeating a step of immersing the chemically formed aluminum foil in an isopropyl alcohol containing 3,4-ethylenedioxythiophene dissolved therein, followed by drying, and a step of immersing the chemically formed aluminum foil in an aqueous solution containing sodium anthraquinone sulfonate and ammonium persulfate dissolved therein, followed by drying.

Furthermore, the aluminum foil having the electroconductive polymer layer formed thereon and an electrode were immersed in 10% aqueous ammonium adipate solution to perform chemical reformation of the dielectric layer by applying a voltage of 3 V the aluminum foil and the electrode for one minute. Carbon paste was applied on the surface of the aluminum foil by immersing the chemically reformed aluminum foil into carbon paste composed of 7% by mass of carbon particles, 3% by mass of fluorine resin and 90% by mass of isoamyl acetate. The viscosity of the carbon paste was 60 cpoise. The coating carbon particles were composed of those having two different diameter ranges, one is from 10 to 100 nm and the other from 0.8 to 8 µm, and the mass ratio of the two types was 30 to 70. After drying at 130° C. for 10 minutes, the carbon paste layer had a thickness of 9 µm and 74% by mass of carbon particles was contained in the carbon paste layer.

Next, silver paste was applied on the surface of the aluminum foil by immersing the aluminum foil coated with carbon paste into silver paste composed of 55.7% by mass of silver particles, 5.9% by mass of fluorine resin, 38.1% by mass of isoamyl acetate and 0.3% by mass of water. The percent by mass is based on the weight measured by a thermogravimetry unit (TG8129, produced by Rigaku Corporation) and a Karl Fischer moisture meter (MKS-500, produced by Kyoto Electronics Manufacturing Co., Ltd.). The viscosity of the silver paste was 400 cpoise. The coating silver particles were in flake form and each having a longitudinal length of from 1 to 5 µm. After drying at 130° C. for 10 minutes, the silver paste layer had a thickness of 13 µm and 90% by mass of silver particles was contained in the silver paste layer.

After applying silver paste on the aluminum foil by a dipping method, the silver paste used in the dipping method was applied with a brush on the side portions of the aluminum foil, followed by drying at 130° C. for ten minutes.

For the brush application, after immersing a commercially available brush for painting watercolors (tip length: about 2 cm) into silver paste and pressing the paint brush to the wall of the paste container to sufficiently extract the paste, the brush was made to touch lightly on the side portions of the foil and move parallel to the side portions to thereby apply a slight amount of silver paste in the vicinity of the side portions (within 1 mm from the side).

The silver paste until being used was stored in a desiccator adjusted to humidity of 30% or lower. Also, the surrounding environment when applying the silver paste was set to humidity of 40% and temperature of 24° C.

The aluminum foil coated with silver paste was embedded into a curing resin consisting of two-liquid mixture, the cured resin was cut into pieces 1 mm wide, and the cut surface of the aluminum foil was observed to measure the thickness distribution of the silver paste layer on the face portion of the aluminum foil. The result showed that the thickness of the silver paste layer was 16 µm on most part. The result of measuring the thickness of the silver paste layer on the side portions of the aluminum foil showed was 24 to 30 µm.

Two sheets of the aluminum foil each having an aluminum oxide layer, an electroconductive polymer layer, a carbon paste layer and a silver paste layer sequentially formed thereon were stacked on a lead flame. The portions on which no aluminum oxide layer, electroconductive polymer layer, carbon paste layer or silver paste layer had been formed were welded to the lead flame. The thus stacked aluminum foil sheets were sealed with an epoxy resin to thereby produce a chip capacitor.

As a result of evaluations by a LCR meter, the average capacitance of 100 units of the obtained capacitor was 102.6 µF at 120 Hz, and the average ESR value was 6.3 mΩ at 100 kHz. As a result of measuring a leakage current by applying a voltage of 2V to 100 units of capacitor, all of the 100 units had a leakage current of 5 μA or less.

Example 7

An electroconductive polymer layer and a carbon paste layer were sequentially formed on the dielectric film formed on the aluminum foil in the same way as in Example 6.

Next, silver paste was applied on the surface of the aluminum foil by immersing the aluminum foil coated with carbon paste into silver paste composed of 55.9% by mass of silver particles, 5.9% by mass of fluorine resin and 38.1% by mass of isoamyl acetate. The percent by mass is based on the weight measured by a thermogravimetry unit (TG8129, produced by Rigaku Corporation) and a Karl Fischer moisture meter (MKS-500, produced by Kyoto Electronics Manufacturing Co., Ltd.).

Further, silver paste was applied with a brush on the edge of the aluminum foil in the same way as in Example 6 to thereby produce a solid electrolytic capacitor.

As a result of evaluations by a LCR meter, the average capacitance of 100 units of the obtained capacitor was 103.5 μF at 120 Hz, and the average ESR value was 6.4 mΩ at 100 kHz. As a result of measuring a leakage current by applying a voltage of 2V to 100 units of capacitor, all of the 100 units had a leakage current of 5 μA or less.

Comparative Example 5

An electroconductive polymer layer and a carbon paste layer were sequentially formed on the dielectric film formed on the aluminum foil in the same way as in Example 6.

Next, silver paste was applied on the surface of the aluminum foil by immersing the aluminum foil coated with carbon paste into silver paste composed of 55.7% by mass of silver particles, 5.9% by mass of fluorine resin, 37.6% by mass of isoamyl acetate and 0.8% by mass of water. The percent by mass is based on the weight measured by a thermogravimetry unit (TG8129, produced by Rigaku Corporation) and a Karl Fischer moisture meter (MKS-500, produced by Kyoto Electronics Manufacturing Co., Ltd.).

Further, silver paste was applied with a brush on the edge of the aluminum foil in the same way as in Example 6 to thereby produce a solid electrolytic capacitor.

As a result of evaluations by a LCR meter, the average capacitance of 100 units of the obtained capacitor was 101.8 μF at 120 Hz, and the average ESR value was 8.4 mΩ at 100 kHz. As a result of measuring a leakage current by applying a voltage of 2V to 100 units of capacitor, all of the 100 units had a leakage current of 5 μA or less.

Comparative Example 6

An electroconductive polymer layer and a carbon paste layer were sequentially formed on the dielectric film formed on the aluminum foil in the same way as in Example 6.

Next, silver paste was applied on the surface of the aluminum foil by immersing the aluminum foil coated with carbon paste into silver paste composed of 55.9% by mass of silver particles, 5.9% by mass of fluorine resin, 35.1% by mass of isoamyl acetate and 3.1% by mass of water. The percent by mass is based on the weight measured by a thermogravimetry unit (TG8129, produced by Rigaku Corporation) and a Karl Fischer moisture meter (MKS-500, produced by Kyoto Electronics Manufacturing Co., Ltd.).

Further, silver paste was applied with a brush on the edge of the aluminum foil in the same way as in Example 6 to thereby produce a solid electrolytic capacitor.

As a result of evaluations by a LCR meter, the average capacitance of 100 units of the obtained capacitor was 101.8 μF at 120 Hz and the average ESR value was 9.0 mΩ at 100 kHz. As a result of measuring a leakage current by applying a voltage of 2V to 100 units of capacitor, all of the 100 units had a leakage current of 5 μA or less.

The results of evaluations of the solid electrolytic capacitors obtained in Examples 6 and 7 and Comparative Examples 5 and 6 are shown in Table 3.

TABLE 3

| Example | Water content of the silver paste layer (%) | ESR (mΩ) | Capacitance (μF) |
| --- | --- | --- | --- |
| Example 6 | 0.3 | 6.3 | 102.6 |
| Example 7 | 0.1 | 6.4 | 103.5 |
| Comparative Example 5 | 0.8 | 8.4 | 101.8 |
| Comparative Example 6 | 3.1 | 9.0 | 101.8 |

As seen in the above Examples, a solid electrolytic capacitor having further lower ESR can be produced by laminating silver paste of a composition having a water content of 0.5 mass % or less, particularly 0.3 mass % or less.

Industrial Applicability

The present invention is to provide a solid electrolytic capacitor which has a laminated structure of silver paste on an anode substrate having a carbon paste layer on the surface and has a sufficiently low equivalent series resistance (ESR) and a high capacitance per unit volume. In the present invention, an element for a solid electrolytic capacitor having low equivalent series resistance (ESR) and a high capacitance per unit volume can be obtained by controlling the composition or a layer thickness of the silver paste constituting a laminated structure on the anode substrate having a carbon paste layer on the surface. By using two kinds of silver pastes each having different wettability on the carbon paste layer and applying the pastes on the side (edge) portions and face portions of an anode substrate, respectively, a desired layer thickness can be obtained as a whole. A solid electrolytic capacitor element preferably has a silver paste layer coating the side (edge) portions of the anode substrate which is thicker than the silver paste layer covering the face portions of the anode substrate, wherein a silver paste of composition having a water amount of 0.5 mass % or less is preferably used. The present invention is to provide a solid electrolytic capacitor element having low equivalent series resistance (ESR) and a high capacitance per unit volume by controlling the thickness of the silver paste layers on the face portions and on the side (edge) portions, which silver paste constitutes a laminated structure on the anode substrate having a carbon paste layer on the surface, and is particularly effective as a method for controlling the silver paste layers on the face portions and on the side (edge) portions when forming the above-mentioned laminated structure of silver paste on the anode substrate foil. As the present invention enables to produce a capacitor element in which equivalent series resistance (ESR) is stably reduced and the thickness of the element is reduced, it is particularly effective in a field of producing a laminated capacitor, which is demanded to have low ESR and reduced thickness. In the present invention, by using two kinds of silver pastes each having different wettability on the carbon paste layer and applying a silver paste of a composition having lower wettability and that having higher wettability on the side (edge) portions and face portions of an anode substrate, respectively, a desired layer thickness can be obtained as a whole. This phenomenon has a wide application in forming a laminated structure comprising a first and a second layers sequentially. The solid electrolytic capacitor and the method for producing the same of the present invention is to provide a solid electrolytic capacitor element having low equivalent series resistance (ESR) and a high capacitance per unit volume wherein the layer thickness on the side (edge) portions is sufficiently secured while that on the face portions is suppressed. According to a method for producing a solid electrolytic capacitor comprising an oxide film layer, an electroconductive polymer layer, a carbon paste layer and a silver paste layer sequentially formed on the surface of an anode substrate comprising valve-acting metal, including a step of dipping the anode substrate on the surface of which an oxide film layer, an electroconductive polymer layer and a carbon paste layer are sequentially laminated into silver paste and a step of applying silver paste by a brush on the side (edge) portions of the anode substrate, a capacitor can be produced, wherein the thickness of a silver paste layer does not vary greatly and therefore the capacitance per unit volume is high and ESR is low. The solid electrolytic capacitor and the method for producing the same of the present invention enables to provide a solid electrolytic capacitor element having sufficiently low equivalent series resistance (ESR) and a high capacitance per unit volume.

The invention claimed is:

1. An element for a solid electrolytic capacitor comprising an oxide film layer, an electroconductive polymer layer, a carbon paste layer and a silver paste layer sequentially formed on the surface of an anode substrate comprising a valve-acting metal material, wherein the composition or the thickness of the silver paste layer covering the side (edge) portions and that of the silver paste layer covering the face portions of the anode substrate on the surface of which the oxide film layer, the electroconductive polymer layer and the carbon paste layer are sequentially laminated is controlled, wherein the thickness of the silver paste layer covering the side (edge) portions of the anode substrate is 6 µm or more and the thickness of the silver paste layer covering the face portions of the anode substrate is 20 µm or less, and wherein the silver paste layer covering the side (edge) portions of the anode substrate is thicker than the silver paste layer covering the face portions of the anode substrate, wherein a laminated structure is formed by applying liquid A, which has a composition containing materials to form the silver paste layer on the anode substrate having the carbon paste layer on the surface, on the side (edge) portions of the anode substrate and by applying liquid B, which has a composition of higher wettability than that of liquid A and comprises the materials to form the silver paste layer, on the face portions of the anode substrate.

2. The element for a solid electrolytic capacitor as claimed in claim 1, wherein the laminated structure is formed by applying liquid A on the side (edge) portions of the anode substrate, drying it, and then applying liquid B on the face portions of the anode substrate by dipping the anode substrate into liquid B.

3. The element for a solid electrolytic capacitor as claimed in claim 2, wherein the laminated structure is formed by applying liquid A on only the lower side (edge) portion of the anode substrate by dipping the portion into liquid A, drying it and then applying liquid B on the face portions of the anode substrate by dipping the anode substrate including the face portions into liquid B.

4. The element for a solid electrolytic capacitor as claimed in claim 1, wherein the laminated structure is formed by applying liquid B on the face portions of the anode substrate, drying it and then coating the side (edge) portions of the anode substrate by liquid A by dipping the anode substrate into liquid A.

5. The element for a solid electrolytic capacitor as claimed in claim 1, wherein at least one of the carbon paste layer and the silver paste layer is a coating layer comprising fluorine resin.

6. The element for a solid electrolytic capacitor as claimed in claim 1, wherein the shape of the anode substrate is a plate-shaped foil, a plate or a rod.

7. The element for a solid electrolytic capacitor as claimed in claim 1, wherein the dielectric layer provided on the surface of the anode substrate is a layer of an oxide of a valve-acting metal formed on the surface of the valve-acting metal.

8. The element for a solid electrolytic capacitor as claimed in claim 1, wherein the valve-acting metal is one member selected from a group consisting of aluminum, tantalum, titanium, niobium, zirconium and alloy thereof.

9. The element for a solid electrolytic capacitor as claimed in claim 1, wherein the anode substrate comprising valve-acting metal on the surface of which an oxide film layer is laminated is a chemically-formed aluminum foil.

10. A solid electrolytic capacitor comprising the solid electrolytic capacitor element as claimed in claim 1.

11. A laminated solid electrolytic capacitor comprising a laminated body formed by laminating a plurality of the solid electrolytic capacitor element as claimed in claim 1.

12. The element for a solid electrolytic capacitor as claimed in claim 1, wherein the silver paste layer covering the side (edge) portions of the anode substrate comprising an oxide film layer, an electroconductive polymer layer and a carbon paste layer sequentially formed on the surface is thicker than the silver paste layer covering the face portions of the anode substrate.

13. The element for a solid electrolytic capacitor as claimed in claim 12, wherein the shape of the anode substrate is a plate-shaped foil, a plate or a rod.

14. The element for a solid electrolytic capacitor as claimed in claim 12, wherein the dielectric layer provided on the surface of the anode substrate is a layer of an oxide of a valve-acting metal formed on the surface of the valve-acting metal.

15. The element for a solid electrolytic capacitor as claimed in claim 12, wherein the valve-acting metal is one member selected from a group consisting of aluminum, tantalum, titanium, niobium, zirconium and alloy thereof.

16. The element for a solid electrolytic capacitor as claimed in claim 12, wherein the anode substrate comprising valve-acting metal on the surface of which an oxide film layer is laminated is a chemically-formed aluminum foil.

17. The element for a solid electrolytic capacitor as claimed in claim 1, wherein the silver paste layer covering the side (edge) portions of the anode substrate comprising an oxide film layer, an electroconductive polymer layer and a carbon paste layer sequentially formed on the surface has thickness of 10 µm or more.

18. The element for a solid electrolytic capacitor as claimed in claim 17, wherein the silver paste layer covering the side (edge) portions of the anode substrate comprising an oxide film layer, an electroconductive polymer layer and a carbon paste layer sequentially formed on the surface has thickness of 10 to 200 µm.

19. The element for a solid electrolytic capacitor as claimed in claim 17, wherein the shape of the anode substrate is a plate-shaped foil, a plate or a rod.

20. The element for a solid electrolytic capacitor as claimed in claim 17, wherein the dielectric layer provided on the surface of the anode substrate is a layer of an oxide of a valve-acting metal formed on the surface of the valve-acting metal.

21. The element for a solid electrolytic capacitor as claimed in claim 17, wherein the valve-acting metal is one member selected from a group consisting of aluminum, tantalum, titanium, niobium, zirconium and alloy thereof.

22. The element for a solid electrolytic capacitor as claimed in claim 17, wherein the anode substrate comprising valve-acting metal on the surface of which an oxide film layer is laminated is a chemically-formed aluminum foil.

23. The element for a solid electrolytic capacitor as claimed in claim 1, wherein silver paste having water content of 0.5 mass % or less is laminated.

24. The element for a solid electrolytic capacitor as claimed in claim 23, wherein the water content of the silver paste is 0.3 mass % or less.

25. The element for a solid electrolytic capacitor as claimed in claim 23, wherein the shape of the anode substrate is a plate-shaped foil, a plate or a rod.

26. The element for a solid electrolytic capacitor as claimed in claim 23, wherein the dielectric layer provided on the surface of the anode substrate is a layer of an oxide of a valve-acting metal formed on the surface of the valve-acting metal.

27. The element for a solid electrolytic capacitor as claimed in claim 23, wherein the valve-acting metal is one member selected from a group consisting of aluminum, tantalum, titanium, niobium, zirconium and alloy thereof.

28. The element for a solid electrolytic capacitor as claimed in claim 23, wherein the anode substrate comprising valve-acting metal on the surface of which an oxide film layer is laminated is a chemically-formed aluminum foil.

29. A method for forming a laminated structure, which is a method for forming a laminated structure comprising a second coating layer on the first coating layer formed on the surface of a foil, comprising a step of applying liquid A containing materials for forming the second coating layer on the side (edge) portions of the foil and a step of applying liquid B containing materials for forming the second coating layer and having lower wettability than that of liquid A on the face portions of the foil.

30. The method for forming a laminated structure as claimed in claim 29, comprising applying liquid A on the side (edge) portions of the foil, drying it and then applying liquid B on the face portions of the foil by dipping the foil into liquid B.

31. The method for forming a laminated structure as claimed in claim 30, comprising applying liquid A by dipping only the lower side (edge) portion of the foil into liquid A, drying the foil, and then applying liquid B on the face portions of the foil by dipping the foil including the face portions into liquid B.

32. The method for forming a laminated structure as claimed in claim 29, comprising applying liquid B on the face portions of the foil, drying it and then coating the side (edge) portions of the foil by dipping the foil into liquid A.

33. The method for forming a laminated structure as claimed in claim 29, wherein at least one of the first and second coating layers contains fluorine resin.

34. The method for forming a laminated structure as claimed in claim 29, wherein the first coating layer is a carbon paste layer and the second coating layer is a layer of electroconductive paste other than carbon paste.

35. A method for producing an element for a solid electrolytic capacitor, wherein a cathode part is made by sequentially forming a carbon paste layer and an electroconductive paste layer on the solid electrolyte layer of a solid electrolytic capacitor element having a solid electrolyte layer on a part of the surface, using the method for forming a laminated structure as claimed in claim 34 in the step of laminating a carbon paste layer and an electroconductive paste layer.

36. The method for producing an element for a solid electrolytic capacitor as claimed in claim 35, wherein the electroconductive paste is silver paste.

37. An element for a solid electrolytic capacitor produced by the method as claimed in claim 36.

38. A solid electrolytic capacitor comprising the solid electrolytic capacitor element as claimed in 37.

39. A laminated solid electrolytic capacitor comprising a laminated body formed by laminating a plurality of the solid electrolytic capacitor element as claimed in claim 37.

40. A method for producing an element for a solid electrolytic capacitor comprising an oxide film layer, an electroconductive polymer layer, a carbon paste layer and a silver paste layer sequentially formed on the surface of an anode substrate comprising a valve-acting metal material, comprising a step of dipping the anode substrate on the surface of which an oxide film layer, an electroconductive polymer layer and a carbon paste layer are sequentially laminated into silver paste and a step of applying silver paste by a brush on the side (edge) portions of the anode substrate, wherein the thickness of the silver paste layer covering the side (edge) portions of the anode substrate is 6 μm or more and the thickness of the silver paste layer covering the surface of the anode substrate is 20 μm or less, and wherein the silver paste layer covering the side (edge) portions of the anode substrate is thicker than the silver paste layer covering the surface of the anode substrate.

41. The method for producing an element for a solid electrolytic capacitor as claimed in claim 40, wherein the shape of the anode substrate is a plate-shaped foil, a plate or a rod.

42. The method for producing an element for a solid electrolytic capacitor as claimed in claim 40, wherein the dielectric layer provided on the surface of the anode substrate is a layer of an oxide of a valve-acting metal formed on the surface of the valve-acting metal.

43. The method for producing an element for a solid electrolytic capacitor as claimed in claim 40, wherein the valve-acting metal is one member selected from a group consisting of aluminum, tantalum, titanium, niobium, zirconium and alloy thereof.

44. The method for producing an element for a solid electrolytic capacitor as claimed in claim 40, wherein the anode substrate comprising valve-acting metal on the surface of which an oxide film layer is laminated is a chemically-formed aluminum foil.

* * * * *